May 28, 1946.      J. B. WEAVER ET AL      2,401,126
HULL FORM
Filed Jan. 4, 1943      10 Sheets-Sheet 1
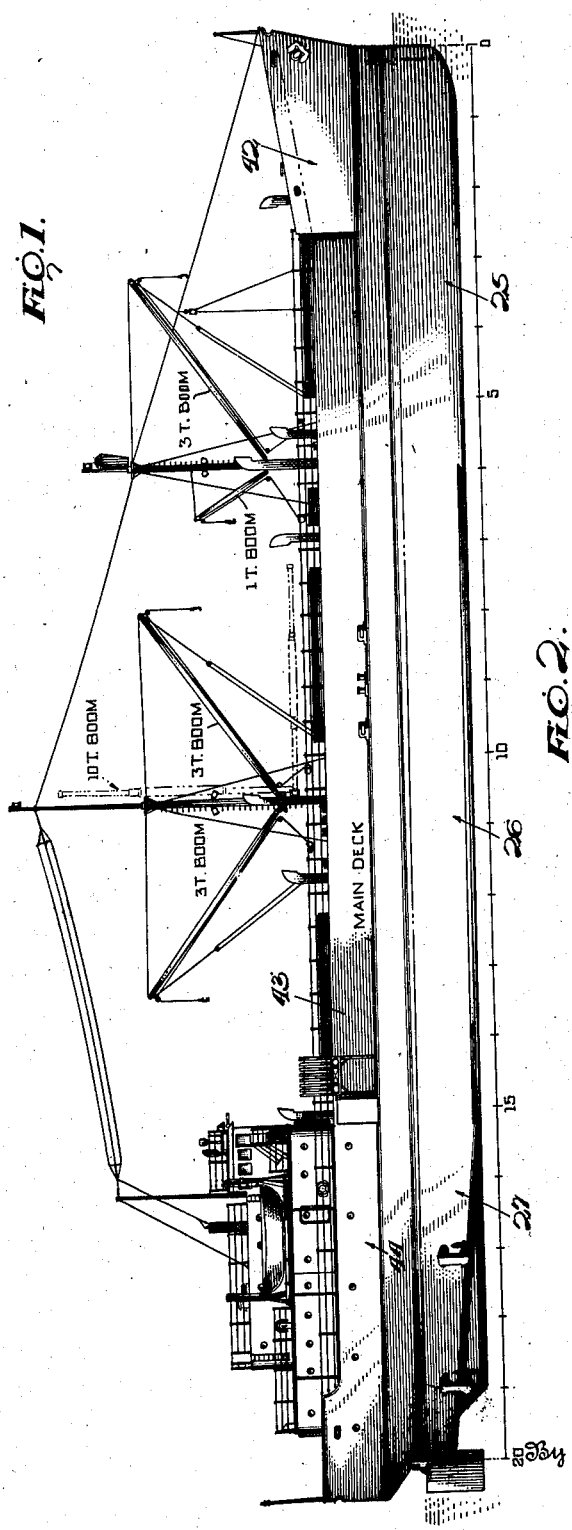
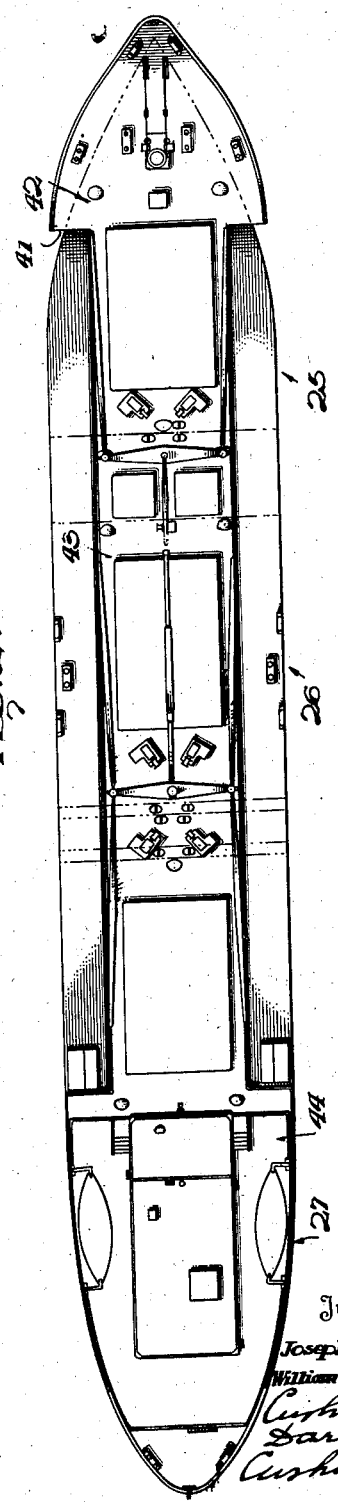

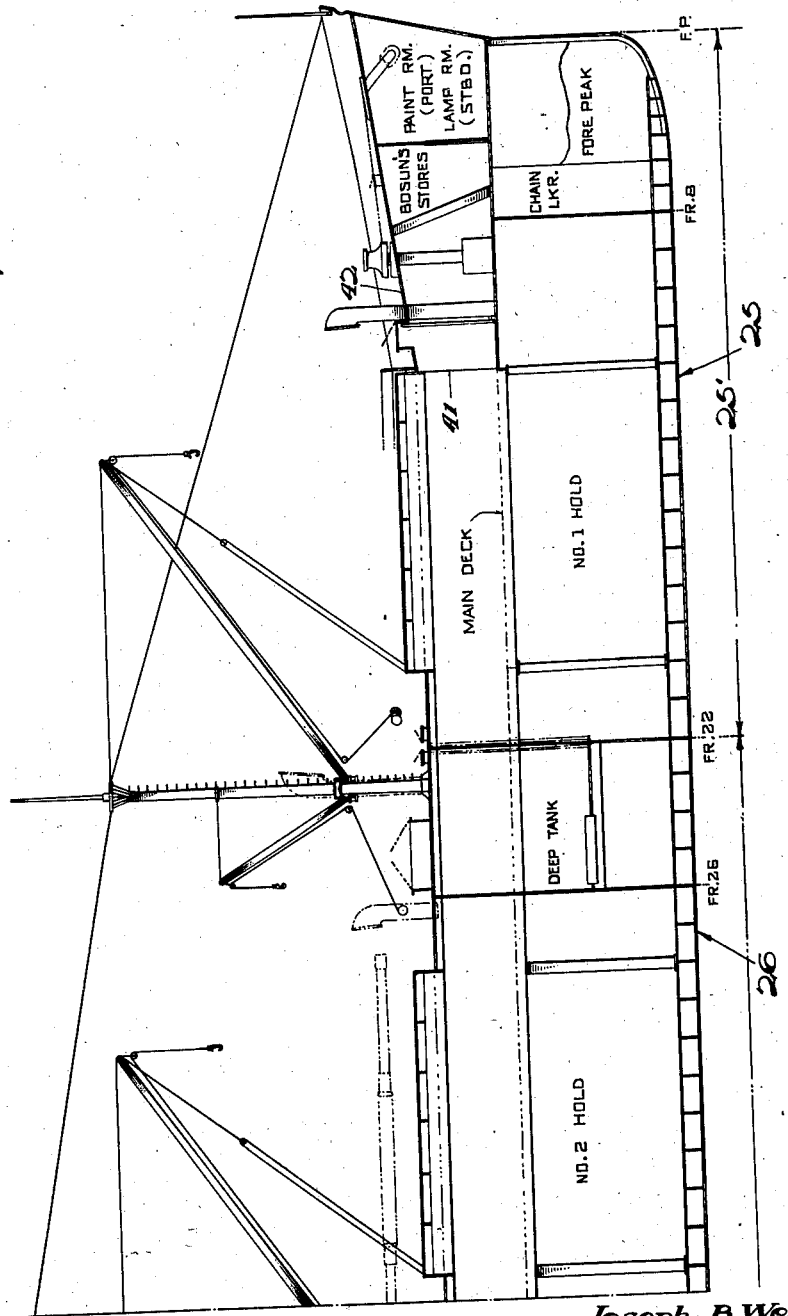

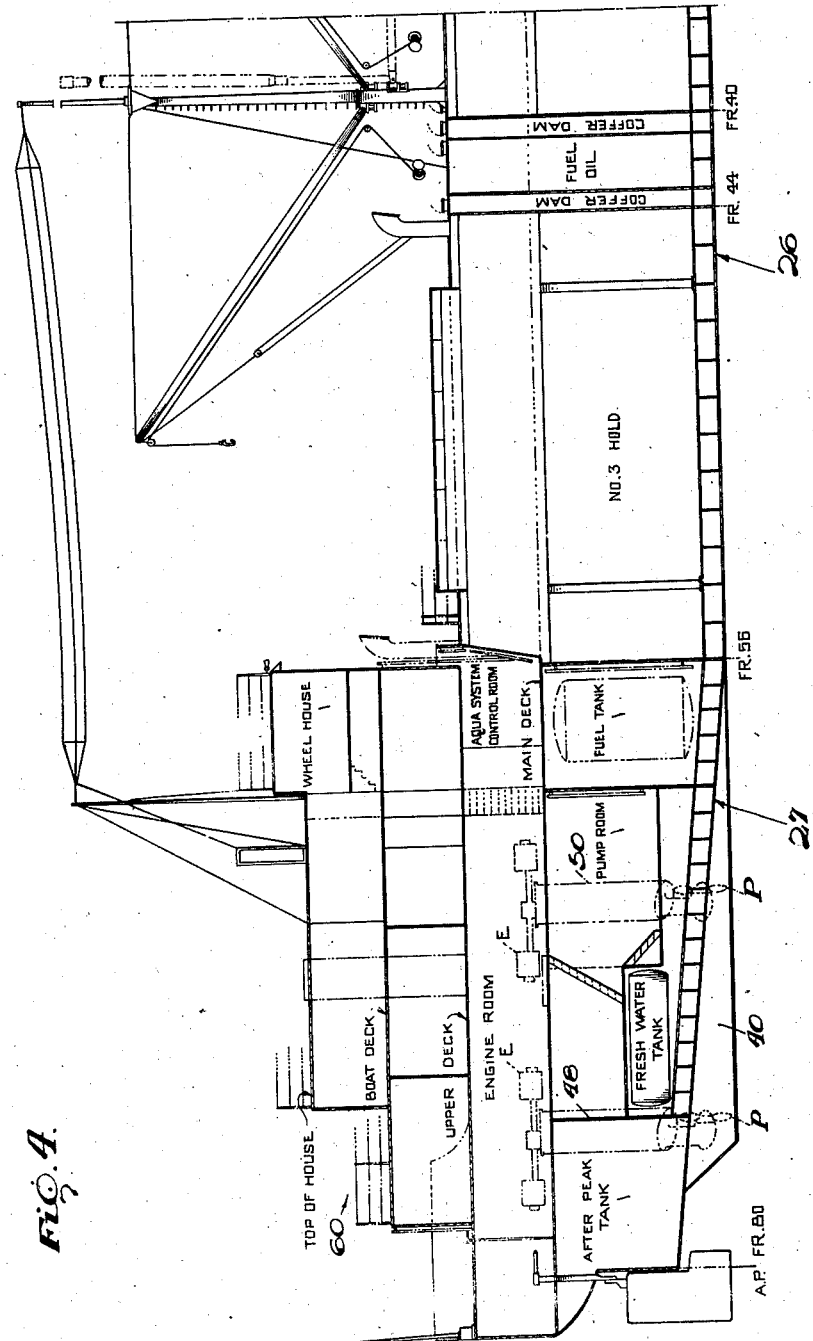

May 28, 1946. J. B. WEAVER ET AL 2,401,126
HULL FORM
Filed Jan. 4, 1943 10 Sheets-Sheet 4

Inventors
Joseph B. Weaver
William Starling Burgess
By Cushman Darby & Cushman
Attorneys

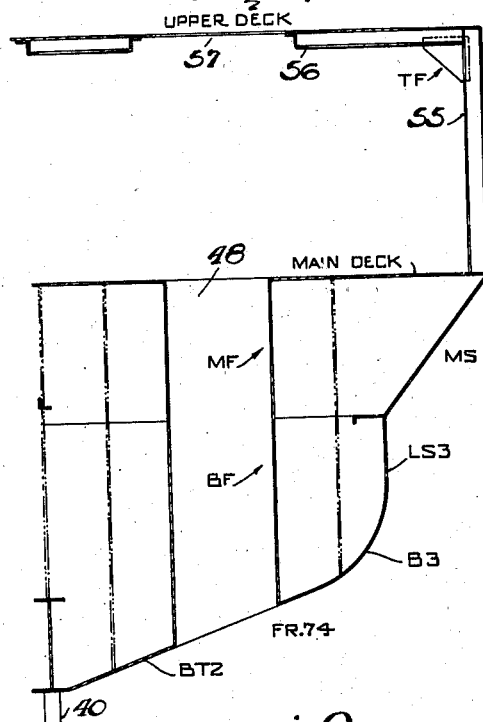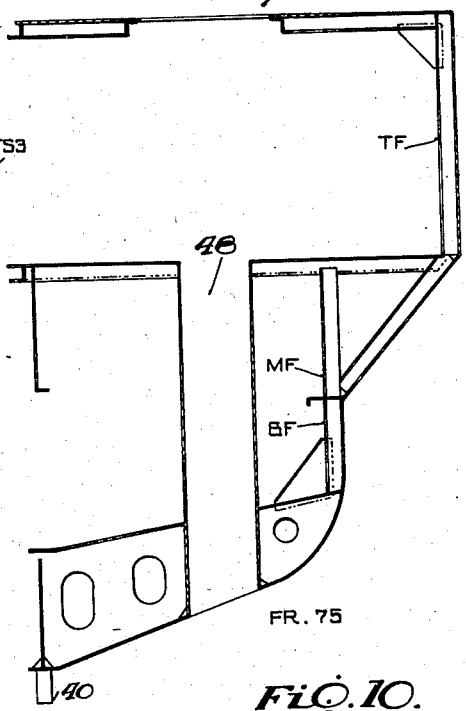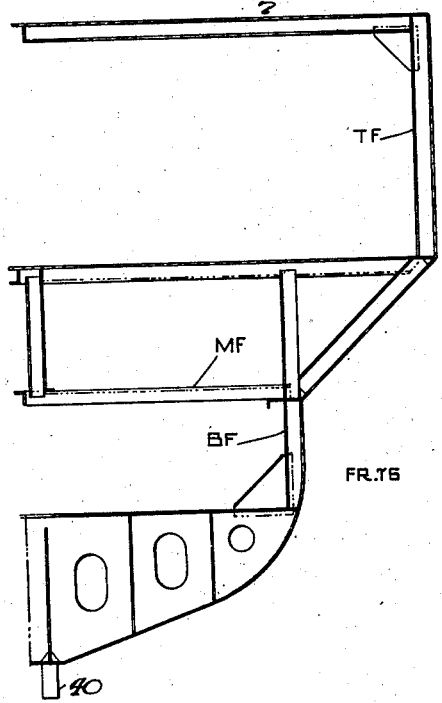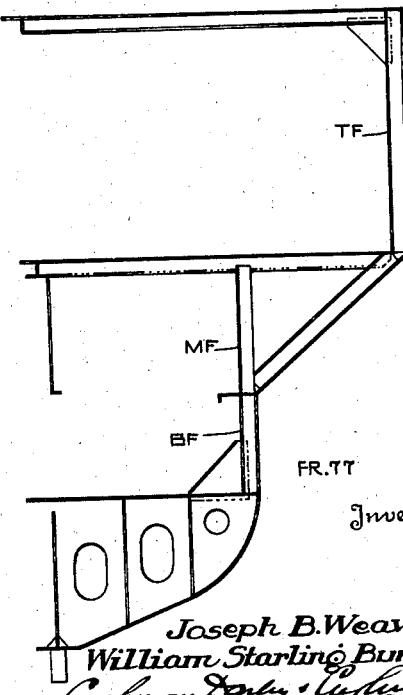

May 28, 1946. J. B. WEAVER ET AL 2,401,126
HULL FORM
Filed Jan. 4, 1943 10 Sheets-Sheet 6
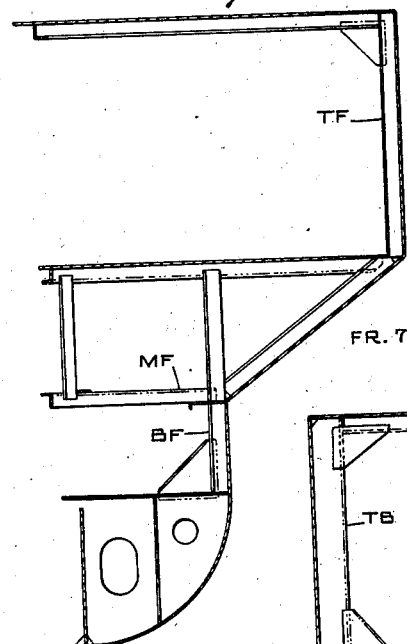
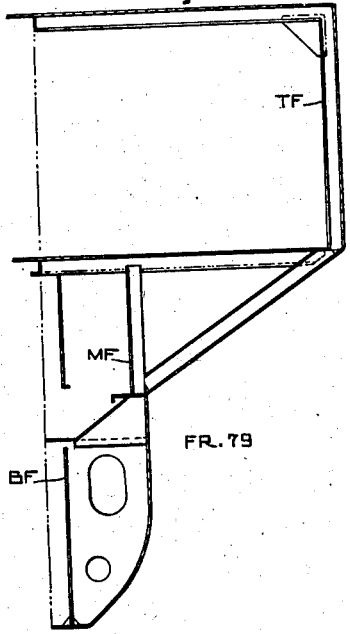
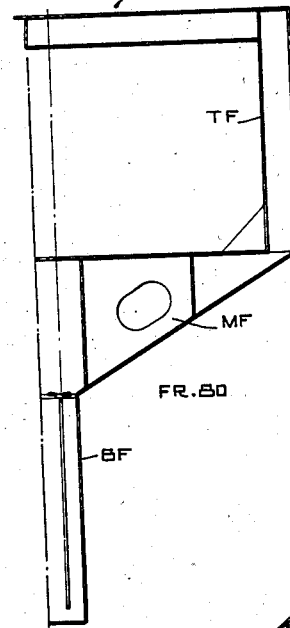
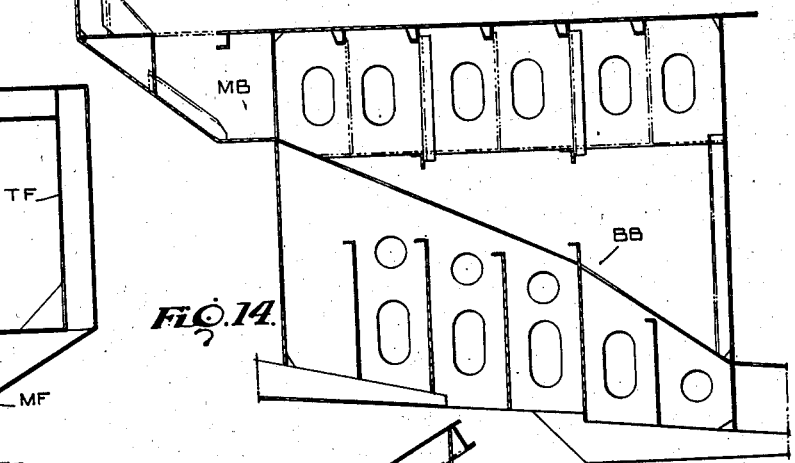
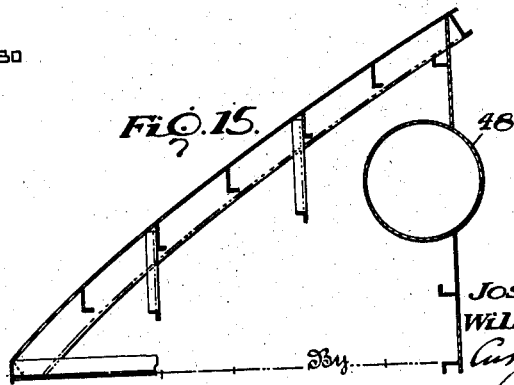

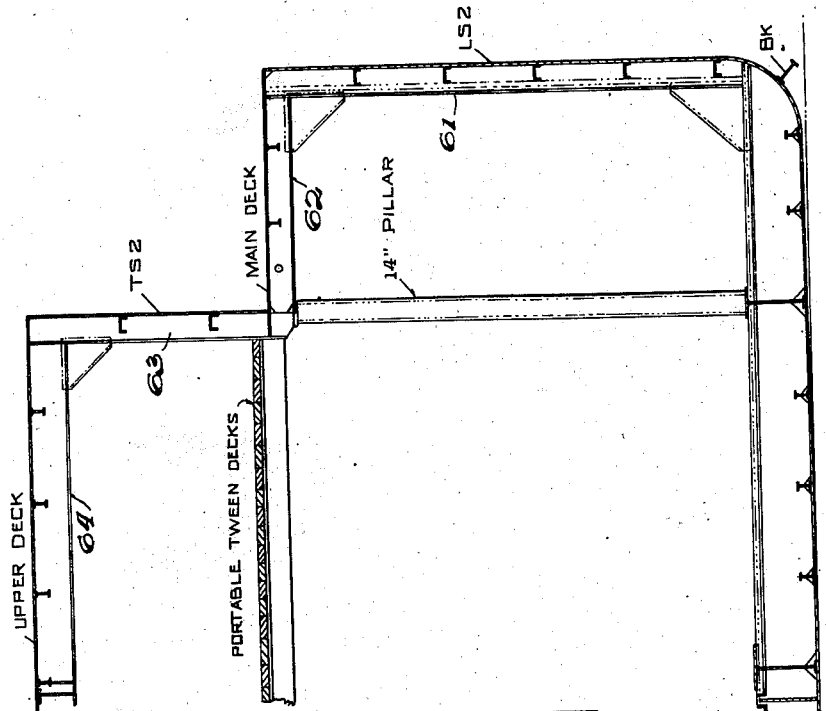
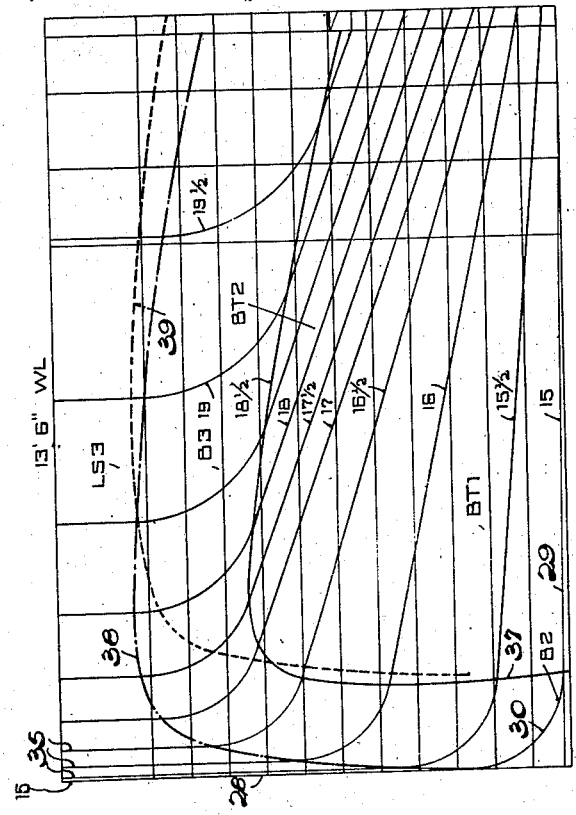

Inventors
Joseph B. Weaver
William Starling Burgess
By Cushman Darby & Cushman
Attorneys May 28, 1946.　　J. B. WEAVER ET AL　　2,401,126
HULL FORM
Filed Jan. 4, 1943　　10 Sheets-Sheet 9
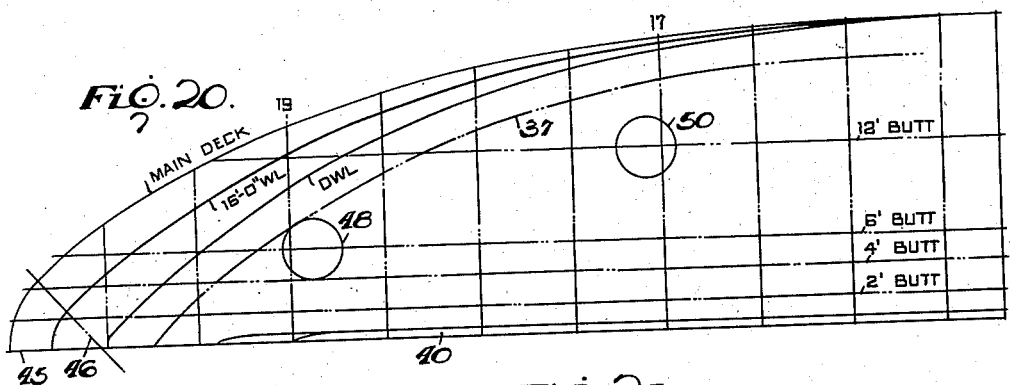
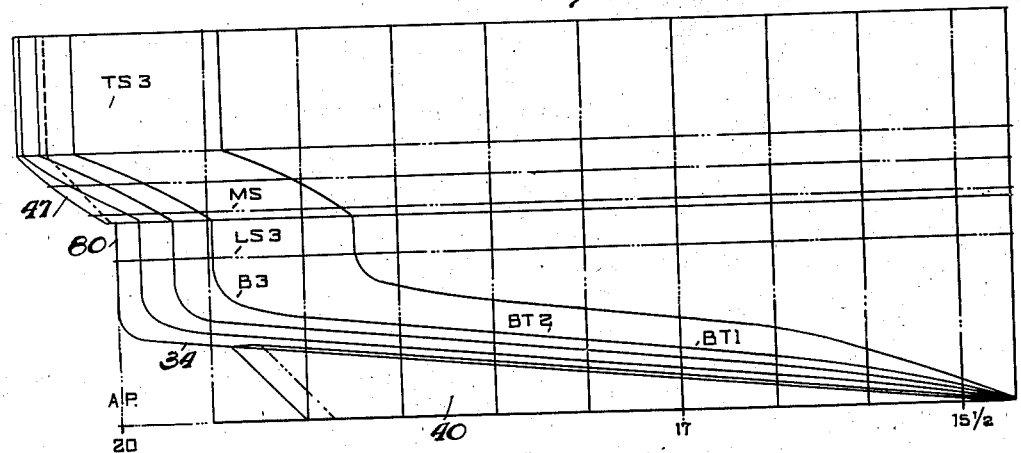
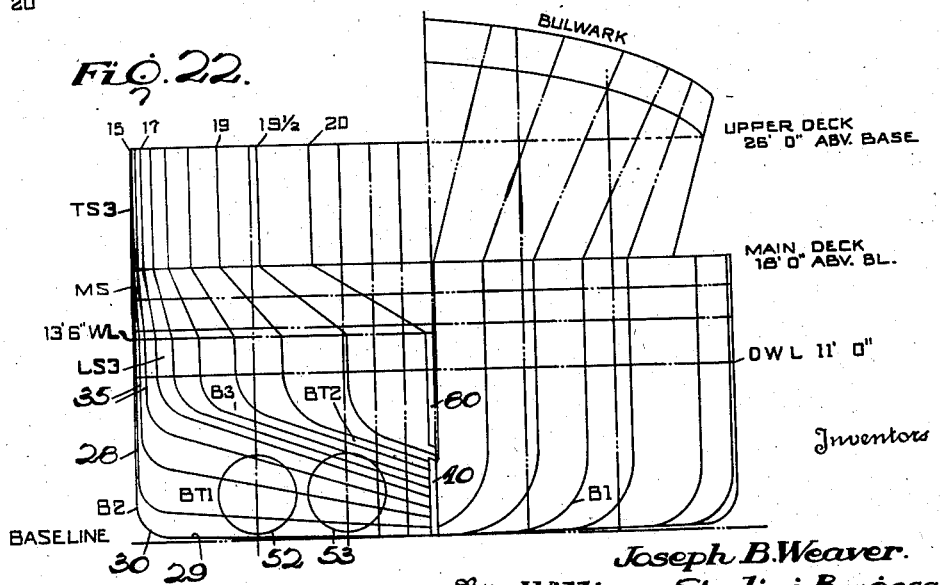
Inventors
Joseph B. Weaver.
By William Starling Burgess
Attorneys May 28, 1946.  J. B. WEAVER ET AL  2,401,126
HULL FORM
Filed Jan. 4, 1943  10 Sheets-Sheet 10
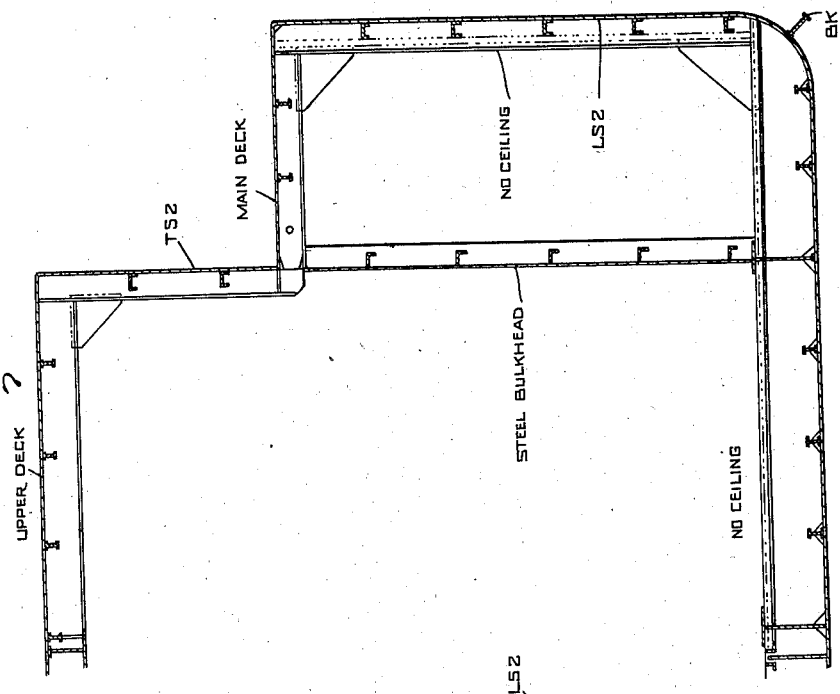
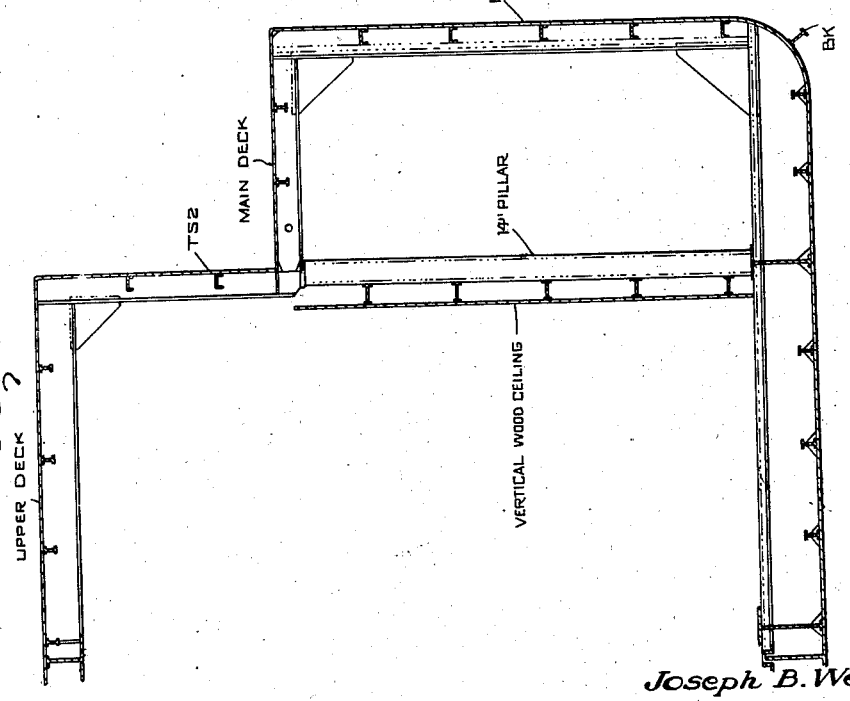
Inventors
Joseph B. Weaver
William Starling Burgess
By Cushman Darby & Cushman
Attorneys Patented May 28, 1946

2,401,126

UNITED STATES PATENT OFFICE 2,401,126

HULL FORM

Joseph B. Weaver and William Starling Burgess, Washington, D. C., assignors to Weaver Associates Corporation, Washington, D. C., a corporation of Maryland Application January 4, 1943, Serial No. 471,270

8 Claims. (Cl. 114—56)

This invention relates to hull forms, structural features of hulls, and method of hull construction.

An object of the invention is to provide a hull form for boats or ships, such as cargo ships, passenger ships, naval vessels, yachts, etc., characterized by superior speed-horse power efficiency, seaworthiness, maneuverability, and relatively shallow draft. A particular feature of the new vessel is an afterbody having a rising keel line and a V-bottom, and another object of the invention, as made possible by the bottom form, is to provide on each side of the keel line a plurality of wells of equal depth extending between and through the bottom and a deck thereabove, the wells being spaced apart both longitudinally and laterally and adapted to accommodate the transmission mechanism of interchangeable propulsion units. A further object is to provide a metal hull of simple design comprising an assembly of superposed prefabricated increments or units joined together in horizontal planes. Another object is to provide a hull comprising fore- and afterbodies of standard design which can be joined to a middle body which may be standard as to external features but which can be fitted interiorly for lading with different types of cargoes.

How these and other objects are attained under the invention is shown in typical embodiment in the accompanying drawings in which:

Figure 1 is an outboard profile of a ship in accordance with the invention.

Figure 2 is a top plan view of the ship of Figure 1.

Figure 3 is an inboard section of the forward half of the ship of Figures 1 and 2.

Figure 4 is an inboard section of the after half of the ship of Figures 1 and 2.

Figures 7 to 13 are elevations of the port side portions of afterbody frames looking aft.

Figure 14 is an elevation showing afterbody longitudinal framing looking to port.

Figure 15 is an elevation of an afterbody port side stringer.

Figure 16 is a half breadth middlebody section.

Figure 17 shows the lower portion of the afterbody plans.

Figure 20 is a half breadth plan of the afterbody.

Figure 21 is a sheer elevation of the afterbody.

Figure 22 shows the body plans; and

Figures 23 and 24 are sections like that of Figure 16 showing modifications in hold arrangement.

Figure 5:
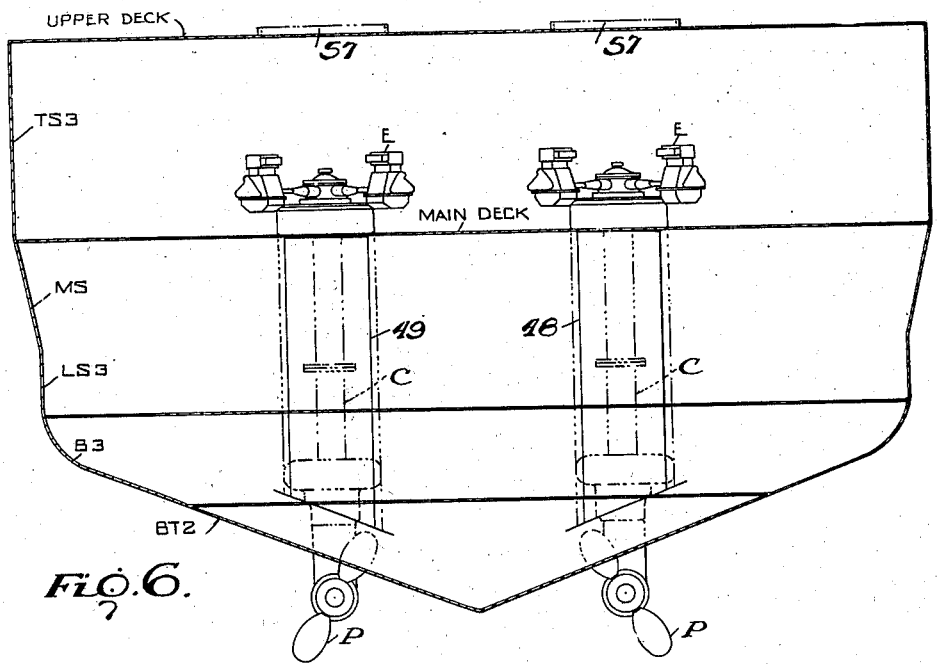
Figure 5 is a transverse section of the afterbody of the ship of Figures 1 and 2 looking aft.

In the drawings the numbers designating the stations, frames and buttock planes are smaller and lighter than the general reference numerals so as to be readily distinguishable.

While the principles underlying the present invention are applicable to boats or ships of widely varying size, the ship herein illustrated as exemplary has a length between perpendiculars of 250 feet and an overall length of 260 feet 1½ inches, the forebody length being 70 feet, the middlebody length 120 feet, and the afterbody length 60 feet. The beam is 40 feet, the design water line, DWL, 11 feet and the load or deep water line, LWL, is 13½ feet. The displacement at 11 foot draft is 2430 tons, and at 13½ foot draft is 3050 tons. Cargo capacity is 1450 tons at 11 foot draft and 2066 tons at 13½ foot draft.

In Figure 1, twenty stations are indicated, the forebody 25 terminating aft at the middlebody 26 between stations 5 and 6 and at frame 22, Figure 3. In Figure 3, 25' indicates the forebody length, i.e., the distance between the forward perpendicular and frame 22. The middlebody terminates aft between stations 15 and 16 at frame 56, Figure 4, at the afterbody 27. The forebody is fined forwardly and the afterbody is fined aft. The middlebody has parallel sides.

The section of the parallel middlebody is uniform throughout, this section being as shown at station 15 in Figures 17 and 22. Referring to these figures, the section shows a vertical side element 28 and a straight bottom element 29 both tangent to an arc 30 at the bilge B2. A deadrise angle of 2° is indicated in the diagrams, but for all intents and purposes the middlebody sections may be considered to be rectangular, except for the rounded bilges.

The arc of the middlebody bilge in the present instance is on a radius of 2½ feet and the length of the arc is constant and somewhat less than 90°, being slightly short of 90° due to the deadrise. Were the arc exactly 90°, i. e. carried down to a truly horizontal bottom element at the base line, it would be bisected by a line bisecting the right angle which would exist between the side and bottom elements. A flat keel, six feet wide, runs throughout the middlebody, the deadrise angle starting at its lateral edges.

Figure 18:
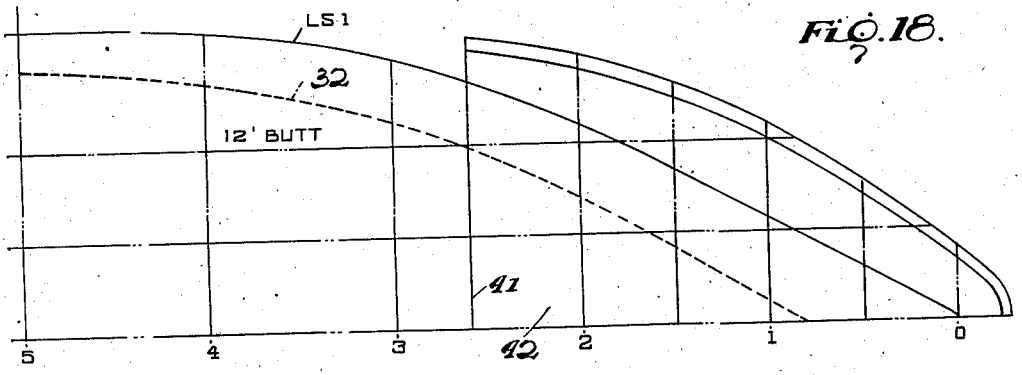
Figure 18 is a half breadth plan of the forebody.
Figure 19:
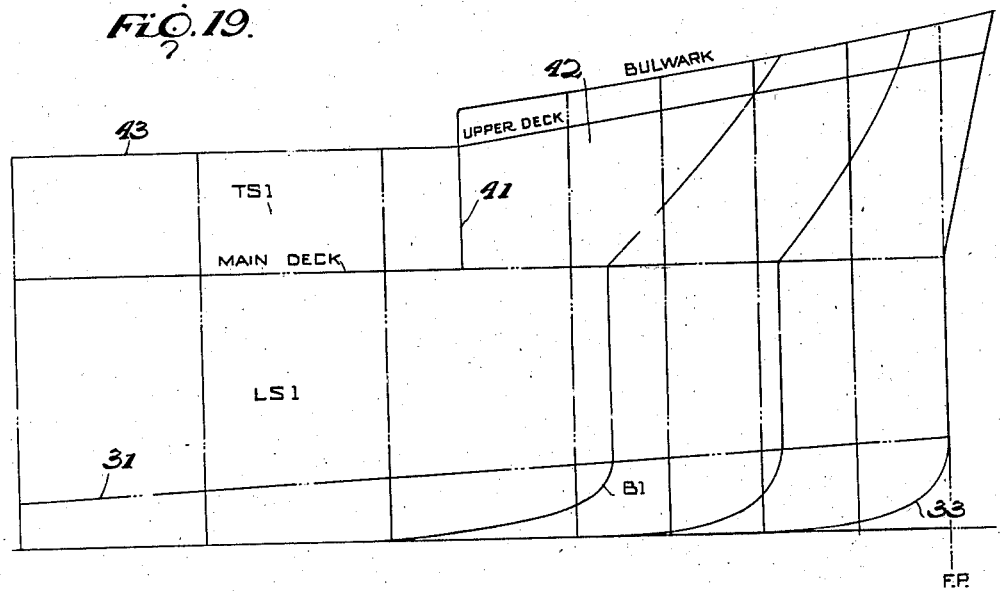
Figure 19 is a sheer elevation of the forebody.

Referring also to Figures 18 and 19, the forebody lower sides LS1 converge forwardly on fair curves, as here shown, from frame 22 to a pointed stem. The forebody bilges B1 start on the same arc as the middlebody bilges, but carry forward on an increasing radius and length of arc to a 6 feet radius at the stem, giving side tangency lines as at 31, Figure 19, which rise forwardly, and bottom tangency lines as at 32, Figure 18, which converge forwardly and meet forwardly, at about station 1, in a substantially elliptical line 33, Figure 19, in the plane of symmetry. The flat keel is carried forward until lost at the converging of the bottom tangency lines, and the same 2° deadrise angle is present throughout the forebody forward to the point where the bottom tangency lines meet the keel. There is thus a slight constant deadrise angle throughout the forebody and middlebody and their keel line is straight except where the bilges intersect forward. The arc of the forebody bilges is nearly 90° throughout and is substantially symmetrically arranged with respect to the sides and bottom as in the case of the middlebody bilges. Each forebody bilge is in effect a truncated substantially quarter conic surface bent along the forebody into tangency with the side and bottom elements. It may be stated that while arcuate bilges in general serve to decrease resistance, the effect is much more marked where the radius and length of the arc is increased forward in the forebody, and also aft in the afterbody. In the present instance the afterbody bilges have the increasing radius and length of arc and are in association with a special bottom formation enhancing smoothness of flow.

Referring to Figures 17 and 20 to 22, it will be observed that the bottom of the afterbody winds upwardly aft from the 2° deadrise at its forward end and from a rising keel line 34, the angle of rise, as here shown, being about 5°, the upward wind continuing to station 17 where the deadrise angle is about 20° which continues aft to the stern. Thus there are present at the sides of the plane of symmetry sections BT1 which wind aft from the middlebody through about ⅜ of the length of the afterbody, as here shown, and terminate in sections BT2 having a constant deadrise to the stern. A winding surface is one generated by a straight line moved sidewise and progressively tilted. Thus, sections BT1 are generated by sidewise-moving lines whose inner ends follow the keel line aft while the lines are progressively tilted from the 2° initial angle to an angle of about 20° at station 17. The keel line rises aft throughout the afterbody and following the keel line nearly to station 19½ is a skeg 40. The afterbody has lower sides LS3 with elements 35 which rise vertically from the bilges B3 to a horizontal plane at the 13½ foot water line, and these sides converge aft on fair curves throughout the length of the afterbody to the transom 80. The afterbody bilges B3 start on the arc of the middlebody bilges and run aft uniformly to station 17, where the radius and length of arc begin to increase, the radius going to a theoretical five feet at station 20 where the bilges are rounded into the transom. The bottom elements are tangent to the lower edge of the bilge on a bottom tangency line 37, Figures 17 and 20, while the side elements are tangent to the bilge on a side tangency line 38. The centers of the arcs are on a line 39.

The sides LS1 of the forebody terminate upwardly at the horizontal plane of the main deck, which extends throughout the hull, and the same is true of the middlebody sides. A bulkhead 41 rises from the main deck between stations 2 and 3 and from this bulkhead a forecastle structure 42 extends forward to the stem and has flared sides merging with the upper edges of the sides LS1.

The forebody includes parallel top sides TS1 set inwardly at the main deck on the twelve foot buttock planes and extending from the bulkhead 41 to continuing walls in the middlebody to provide a trunk 43 at the top of which is the upper deck. At the afterbody the trunk runs into a transverse bulkhead at the forward end of a poop structure 44 whose sides TS3, starting in vertical alignment with the lower sides LS3, converge aft on fair curves of greater radius than that of the sides LS3 so that a progressively greater overhang is present aft. The curve of the sides TS3 is that of the main deck, Figure 20, while the curve of the sides LS3 is the same as that at DWL. The sides TS3 at their after extremities merge with the curved wall of a stern piece 45 at tangency lines as at 46, Figure 20.

The lower edges of sides TS3 are in a horizontal plane spaced above the horizontal plane in which sides LS3 terminate upwardly and these edges are joined by middle sides MS which wind aft to the transom and are merged with the lower edge of the stern piece wall through a merging wall 47. The middle sides closely approach a conic section, i. e., are surfaces of single curvature.

The main deck is eighteen feet above base line and, consequently, is normally well above load water line. However, upon excessive roll the deck portions at the sides of the trunk will dip and the weight of the water caught thereby will act to retard the return.

Figure 6:
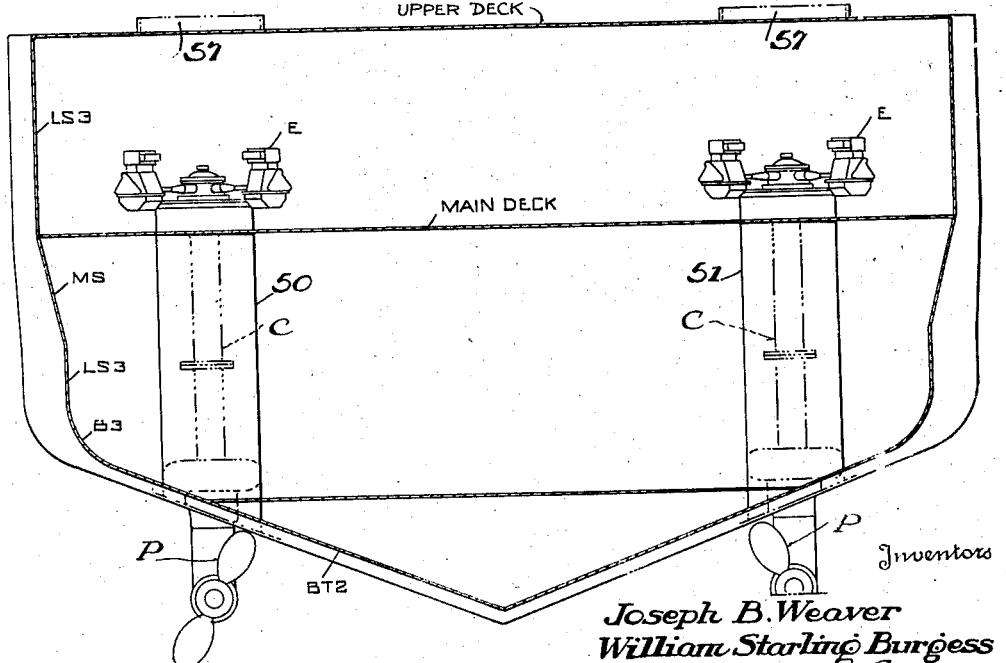
Figure 6 is an afterbody section forward of the section of Figure 5 looking forward.

Figure 5 is a transverse section of the afterbody looking aft from frame 68. Figure 6 is a transverse section of the afterbody looking forward from frame 66½. Reference numerals 48 and 49 designate vertical cylindrical wells largely forward of frame 75 and extending between and through the main deck and the bottom sections BT2 with their centers on the six foot buttock planes. Reference numerals 50 and 51 designate vertical cylindrical wells disposed largely aft of frame 65 and extending between and through the main deck and the bottom sections BT2, although somewhat intersecting sections BT1, with their centers on the twelve foot buttock planes. These four wells all have the same depth at their centers, this being possible by reason of the rise aft of the V-section bottom. This being the case, the wells are adapted to accommodate interchangeable propulsion units including engines E above the main deck, vertical drive connections C in the wells, and propellers P beneath the bottom sections BT2 but with their circles still above the base line as is evident in Figure 1 and also in Figure 22 wherein the circles of the two starboard propellers are indicated by the reference numerals 52 and 53. Thus, the form of the afterbody bottom is not only such as to reduce backwash, but it also enables interchangeable propulsion units to be used with the propellers on each side so spaced apart laterally as to minimize interfering action. The propulsion units may be such as are disclosed in Patent No. 2,302,795, granted November 24, 1942, to Warren Noble.

Figures 7 to 13 show the port side portions looking aft, of afterbody frames 74 to 80, respectively. The frame 74, Figure 7, comprises a portion TF with an upright member 55 which carries the plating or skin TS3 and a transverse member 56 which supports the upper deck plating. Below frame portion 54 is a frame portion in the form of a web MF, interrupted at the well 48, which carries the plating MS and the main deck plating. A bottom portion BF of the frame carries the plating LS3, the bilge plating and the bottom plating. Frames 75 to 80 are similarly divided into top, middle and bottom portions TF, MF and BF. As here contemplated, the bottom frame portions TF of the afterbody are set up and assembled with the longitudinals and the plating is applied. The middle frame portions MF are set up in conjunction with supporting longitudinals and the plating MS and main deck plating is applied. This middle frame unit is then lowered onto the bottom frame unit and the frame portions are welded together and the plating portions LS3 and MS, whose edges will abut, are welded together. The well tubes are now positioned and welded top and bottom. The previously assembled top frame portion, with necessary longitudinals, side plating TS3 and upper deck plating is now lowered onto the middle frame portion and joined to the latter by welding.

Installation of machinery and other equipment can proceed as convenient during assembly of the superposed increments or units. For example, after the middle frame unit has been joined with the bottom frame unit and the wells have been installed, the propulsion units may be mounted, although this can be done later on and may be facilitated by hatches 57 in the upper deck, directly above the wells.

Figure 14 shows the portion of a swash bulkhead from frames 74 to 80, this being divided horizontally into top, middle and bottom portions TB, MB and BB in the same manner as the frames.

Figure 15 shows the stringers from frames 74 to 80.

Figure 16 shows in half breadth a typical middlebody transverse. This transverse comprises a floor, a side transverse 61 rising from the floor to a main deck transverse 62 which extends inwardly to a trunk transverse 63 rising to an upper deck transverse 64. The transverse 61 carries the side plating LS2 and the transverse 63 carries the side plating TS2. If desired, the transverse 61 may be made in upper and lower parts which abut at the level of the top edge of the bottom plating LS3 of the afterbody. In such case the plating LS2 also has a horizontal joint in the plane of abutment of the transverse portions so that the middlebody can be assembled with superimposed increments, as described in connection with the afterbody. Similarly, the trunk with its transverse portions can be formed as a separate unit united with the main structure at the level of the main deck by welding.

As indicated in Figure 16, two parallel rows of pillars or stanchions extend throughout the middlebody substantially under the sides of the trunk, and beams are supported in the trunk at substantially the top of the main deck and support a portable or removable 'tween decks. Separate cargoes can thus be carried above and below the 'tween decks.

Referring to Figure 23, the pillars are shown as supporting ceilings on their opposed faces, whereby the cargo may be confined to the space in the middlebody between the rows of pillars. These provisions are particularly useful when, in loading the ship with any heavy bulk cargo, such as iron ore, and the like, the cargo space must be narrowed to raise the center of gravity to a safe point. In such case the wing compartments will be left vacant or loaded with light cargo. Transverse bulkheads can be provided in the middlebody as required.

In Figure 24, steel bulkheads extend downwardly from the main deck to the floor beneath the sides of the trunk, and constitute the side walls of separate middle and wing tanks for wet cargo. Transverse bulkheads can be provided as required. Oil, for example, may be carried between the longitudinal bulkheads and the wing tanks can be used for different types of wet cargo. The space outboard from the wing bulkheads in way of the trunk sides will also serve as summer tanks.

There is also the possibility of stowage of deck load at the sides of the trunk. Lumber, for example, can be conveniently carried in this manner.

The forebody may be built up of prefabricated units welded together in substantially horizontal planes, and after the middlebody and fore- and afterbodies have been thus separately assembled they are set in proper relationship and welded together in substantially vertical planes.

A typical interior layout is shown in Figures 3 and 4. In Figure 4 it will be noted that the propulsion and control apparatus are concentrated in the afterbody. Space is allowed in the pump room for the installation of ventilating machinery when required, for refrigerating machinery in the case of refrigerated cargo, and for pumping machinery in the case of liquid cargo. A superstructure 60 above the upper deck contains the quarters. This entire poop superstructure may be prefabricated as a unit, or as separate units divided, for example, at the boat deck, and then welded in position on the under structure. It will be noted that substantially the entire middlebody is available for cargo and that the adjacent and main part of the forebody is similarly available.

It will be understood that while typical proportions have been given, this is merely by way of example. Variations in such matters and in the form and arrangement of parts are contemplated under the claims which follow.

We claim:
1. A displacement type hull comprising a middle-body and fore- and afterbodies, the forebody being fined forwardly and the afterbody being fined aft, said hull having arcuate bilges throughout, and the afterbody having a bottom including sections at the sides of the plane of symmetry which start substantially at the horizontal and wind upwardly aft from a keel line which rises aft.

2. A displacement type hull comprising a middle-body and fore- and afterbodies, the forebody being fined forwardly and the afterbody being fined aft, said hull having arcuate bilges throughout, and the afterbody having a bottom including sections at the sides of the plane of symmetry which start substantially at the horizontal and wind upwardly aft from a keel line which rises aft, said sections terminating aft in sections having a substantially constant deadrise angle which continues to the stern.

3. A displacement type hull comprising a middle-body and fore- and afterbodies, the forebody being fined forwardly and the afterbody being fined aft, said hull having arcuate bilges throughout, and the afterbody having a bottom including sections at the sides of the plane of symmetry which start substantially at the horizontal and wind upwardly aft from a keel line which rises aft, said sections terminating aft in sections having a substantially constant deadrise angle which continues to the stern, the radius and length of arc of the bilges increasing aft throughout the extent of the last-named sections.

4. A displacement type hull comprising a middlebody and fore- and afterbodies, the forebody being fined forwardly and the afterbody being fined aft, said hull having arcuate bilges throughout and straight side and bottom elements tangential to the bilges, said side elements being substantially vertical throughout the hull and said bottom elements being substantially horizontal throughout the forebody and middlebody and the afterbody having a bottom including sections at the sides of the plane of symmetry which start substantially at the horizontal and wind upwardly aft from a keel line which rises aft.

5. A displacement type hull comprising a middlebody and fore- and afterbodies, the forebody being fined forwardly and the afterbody being fined aft, said hull having arcuate bilges throughout and straight side and bottom elements tangential to the bilges, said side elements being substantially vertical throughout the hull and said bottom elements being substantially horizontal throughout the forebody and middlebody, and the afterbody having a bottom including sections at the sides of the plane of symmetry which start substantially at the horizontal and wind upwardly aft from a keel line which rises aft, said sections terminating aft in sections having a substantially constant deadrise angle which continues to the stern.

6. A displacement type hull comprising a middlebody and fore- and afterbodies, the forebody being fined forwardly and the afterbody being fined aft, said hull having arcuate bilges throughout and straight side and bottom elements tangential to the bilges, said side elements being substantially vertical throughout the hull and said bottom elements being substantially horizontal throughout the forebody and middlebody, and the afterbody having a bottom including sections at the sides of the plane of symmetry which start substantially at the horizontal and wind upwardly aft from a keel line which rises aft, said sections terminating aft in sections having a substantially constant deadrise angle which continues to the stern, the radius and length of arc of the bilges increasing aft throughout the extent of the last-named sections.

7. A displacement type hull comprising a middlebody and fore- and afterbodes, the forebody being fined forwardly and the afterbody being fined aft, said hull having arcuate bilges throughout, and the afterbody having a bottom including sections at the sides of the plane of symmetry which wind upwardly aft from a keel line which rises aft, said sections terminating aft in sections having a substantially constant deadrise angle which continues to the stern, the radius and length of arc of the bilges increasing aft throughout the extent of the last-named sections, the afterbody having vertical lower sides tangent to the bilges and terminating upwardly in a substantially horizontal plane and converging aft on fair curves, the afterbody having substantially vertical top sides which converge aft on fair curves of greater radius than the curves of the lower sides and terminate downwardly in a substantially horizontal plane spaced above the first-mentioned plane, said top sides at the forward end of the afterbody being substantially directly above the lower sides but increasingly overhanging the latter aft due to their greater radius, and winding middle sides joining the adjacent edges of the top and lower sides, the elements of all said sides being straight.

8. A displacement type hull comprising a middlebody and fore- and afterbodies; said afterbody having a V bottom, a keel line which rises aft, and a deck; and a pair of vertical wells at each side of the keel line extending between and through said deck and said bottom, one of said wells at each side of the keel line being disposed forwardly and outwardly of the other which is on the same side so as to have substantially the same depth as said other.

JOSEPH B. WEAVER.
WILLIAM STARLING BURGESS.